United States Patent [19]
Edholm

[11] Patent Number: 5,875,314
[45] Date of Patent: Feb. 23, 1999

[54] CONFIGURABLE CONNECTION FABRIC FOR PROVIDING SERIAL BACKPLANES WITH ADAPTIVE PORT/MODULE BANDWIDTH

[75] Inventor: Philip K. Edholm, Fremont, Calif.

[73] Assignee: Northern Telecom Limited, Montreal, Canada

[21] Appl. No.: 742,871

[22] Filed: Nov. 1, 1996

[51] Int. Cl.⁶ .......................... G06F 13/00; G06F 15/17; H04Q 3/00
[52] U.S. Cl. .......................... 395/312; 395/311; 370/386
[58] Field of Search .................................. 395/311, 312, 395/800.29; 370/386, 351, 380

[56] References Cited

U.S. PATENT DOCUMENTS

| | | | |
|---|---|---|---|
| 4,710,769 | 12/1987 | Friedman et al. | 340/825.03 |
| 5,081,575 | 1/1992 | Hiller et al. | 395/312 |
| 5,113,390 | 5/1992 | Hayashi et al. | 370/352 |
| 5,267,235 | 11/1993 | Thacker | 370/60 |
| 5,377,180 | 12/1994 | Laurent | 370/16 |
| 5,396,638 | 3/1995 | Kanekura | 395/377 |
| 5,404,537 | 4/1995 | Olnowich et al. | 370/388 |
| 5,487,155 | 1/1996 | Drewry et al. | 395/311 |
| 5,530,813 | 6/1996 | Paulsen et al. | 395/312 |
| 5,555,543 | 9/1996 | Grohoski et al. | 395/200.39 |
| 5,594,727 | 1/1997 | Kolbenson et al. | 370/442 |
| 5,634,004 | 5/1997 | Gopinath et al. | 395/312 |

FOREIGN PATENT DOCUMENTS

WO 97/27693   7/1997   WIPO .

OTHER PUBLICATIONS

Physical Design Issues for Very Large ATM Switching Systems, by Thomas C. Banwell et al., IEEE Journal on Selected Areas in Communication, vol. 9, No. 8, Oct. 9, 1991, New York, pp. 1227–1238

ATM Switching System—Development and Evaluation, by Koji Suzuki et al., NEC Research & Development, vol. 32, No. 2, Apr. 1991, Tokyo, Japan, pp. 242–251.

*Primary Examiner*—Gopal C. Ray
*Attorney, Agent, or Firm*—Finnegan, Henderson, Farabow, Garrett & Dunner, L.L.P.

[57] ABSTRACT

A configurable connection fabric between a switching fabric and a backplane allows any of the ports of the backplane to be connected to any of the ports of the switching fabric. The connection fabric receives bandwidth load requirements from modules connected to the backplane and uses these load requirements to determine the number of ports required to make a particular connection.

13 Claims, 7 Drawing Sheets

CONFIGURABLE CONNECTION FABRIC FOR PROVIDING SERIAL BACKPLANES WITH ADAPTIVE PORT/MODULE BANDWIDTH

I. BACKGROUND OF THE INVENTION

The present invention relates generally to the field of switching systems, and more particularly to switching fabrics that can be configured to meet different switching requirements.

Advances in switching technology and the introduction of commercial chipsets have made centralized switching engines more desirable. Conventional switching engines, however, with fixed modules or elements connected over a backplane, have bandwidth limitations that limit the effectiveness of the new switching technologies.

Conventional backplanes for Wide Area Networks and Local Area Networks use one three types of architectures: bus, ring, or star. FIG. 1 is a block diagram of a bus-based architecture with three elements 100, 110, and 120, using a shared bus 130. Bus-based architectures usually distribute the switching function, or "switching fabric," by incorporating parts of the fabric, 102, 112, and 122, into bus access logic 104, 114, and 124, respectively, of elements 100, 110, and 120, respectively.

Bus-based architectures offer some cost advantages because new elements only add costs for connectors and module space. Distributing switching functions in such architectures, however, can increase other costs. For example, a bus-based architecture may require memories to be replicated in all of the elements, or may require mechanisms to provide either distributed or centralized bus access. In addition, the bus limits the bandwidth of the system.

Merely adding a centralized fabric to a bus-based system does not necessarily create significant benefits. FIG. 2 is a block diagram of a system with a centralized switch fabric 240. The system, however, not only requires significant bus-access functions but increases bus usage. Traffic must travel from the receiving point, across the backplane to the switching fabric, and then back again over the backplane to the transmitting point. This doubles the bus traffic. Although dual buses could relieve the load from such doubling, that solution would further increase costs.

An alternative to the bus-based architecture is a ring-based architecture, which is often used in stackable units. FIG. 3 is a block diagram of such an architecture in which elements 300, 310, and 320 are connected in a ring through ring access components 305, 315, and 325. This architecture makes expansion easy when the ring can be broken, which offers special advantages for stacks of separate boxes. Rings are difficult to use in a chassis, however, because they require active elements in each slot to complete the ring, even if that slot has no element.

As with busses, the bandwidth of the ring, which requires a parallel path for higher bandwidth systems, limits the bandwidth of the system. Also, as with busses, applying centralized switching functions is difficult, and ring architectures do not provide significant cost or performance advantages by centralizing.

Centralization has been effective, however, for star-based architectures, which have emerged with the advent of significantly less expensive integrated circuit switching functions. For example, products have been built for both 10/100 Mbps Ethernet and ATM. These architectures use a central switching fabric with one or more dedicated port connections to each slot.

FIG. 4 is a block diagram of such a product in which elements 400, 410, and 420 include link access components 405, 415, and 425, respectively, and element 420 is the only element with switch fabric 428. This star-based design allows the use of low cost switching, and its bandwidth is limited only by the number of slots, the bandwidth of the switching chips, and the bandwidth of the channels to each element. Multiple paths to the slots, increase the bandwidth of this architecture as needed.

Another advantage of this architecture is a lower cost of the I/O module because the communication over the backplane link is in the proper switching format. Also, because the direct connection to the switch is operating in a "native" mode, there is no need for buffering or other sophisticated access techniques at the card level.

The disadvantage of this design, however, is that the chassis is relatively inflexible. For example, a chassis with eight I/O slots with two channels to each slot is inherently designed for sixteen times the bandwidth of the interconnect. The fixed connection between a switch point and the slot cannot be changed, for example, to only eight switched interconnects or to use only a single interconnect path to a module. This limitation requires that the chassis be purchased initially in a complete switching configuration, greatly increasing the initial cost. For example, existing designs often incur more than 50% of the cost of a port in the base chassis and switching module, and unused ports or underused ports cost the same as fully used ports.

II. SUMMARY OF THE INVENTION

There is, therefore, a need for new architectures in modular switching products. Ideally, the new architectures should provide variable bandwidth to match the requirements of the specific interface device. In addition, the new architecture should be able to use centralized switching with star topologies on the backplane.

This invention meets that need by a configurable connection fabric between the switching fabric and the digital system creating signals. The connection fabric may be configured to adapt to different digital system needs and configurations.

Additional goals and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a configurable connection of this invention connected to a switching fabric that interconnects its input ports and connected to a digital system having second input ports, the connection fabric includes: configurable switch means capable of being configured in response to control signals to connect any of the first input ports to any of the second input ports; and control means, coupled to the switch means, for creating and sending to the switch means control signals to configure the switch means to connect each of a selected number of the second input ports to corresponding ones of the first input ports.

Both the foregoing general description and the following detailed description are exemplary and explanatory only and are not restrictive of the invention, as claimed. The accompanying drawings, which are incorporated in and constitute a part of this specification, illustrate embodiments of the invention and, together with the description, explain the principles of the invention.

III. BRIEF DESCRIPTION OF THE DRAWINGS

IV. DESCRIPTION OF THE PREFERRED EMBODIMENT

Reference will now be made in detail to the preferred embodiment of this invention, examples of which are illustrated in the accompanying drawings. Wherever possible, the same reference numbers will be used throughout the drawings to refer to the same or like parts.

Figure 1:
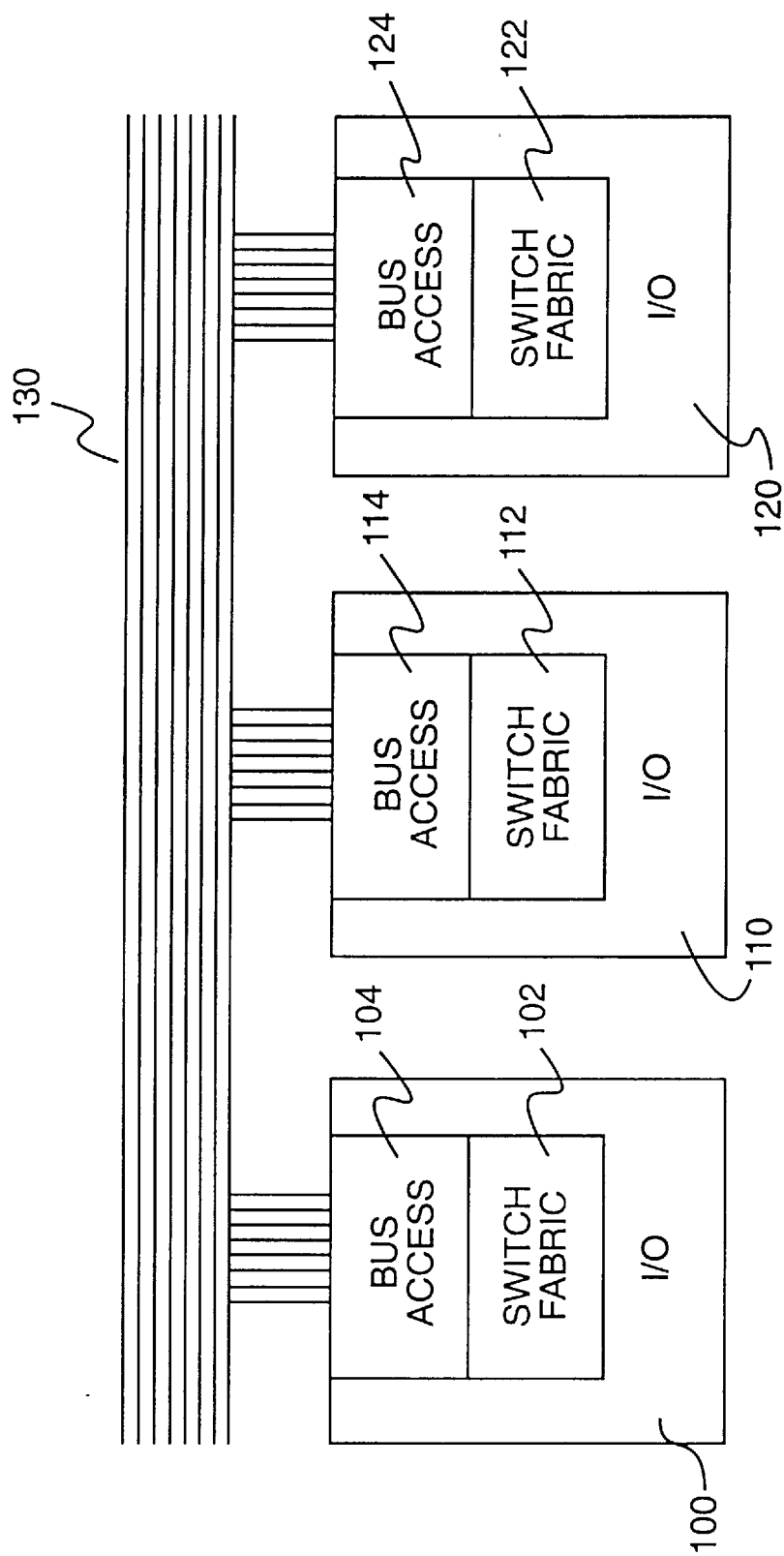
FIG. 1 is a block diagram of a bus-based architecture using a shared bus between system elements.
Figure 2:
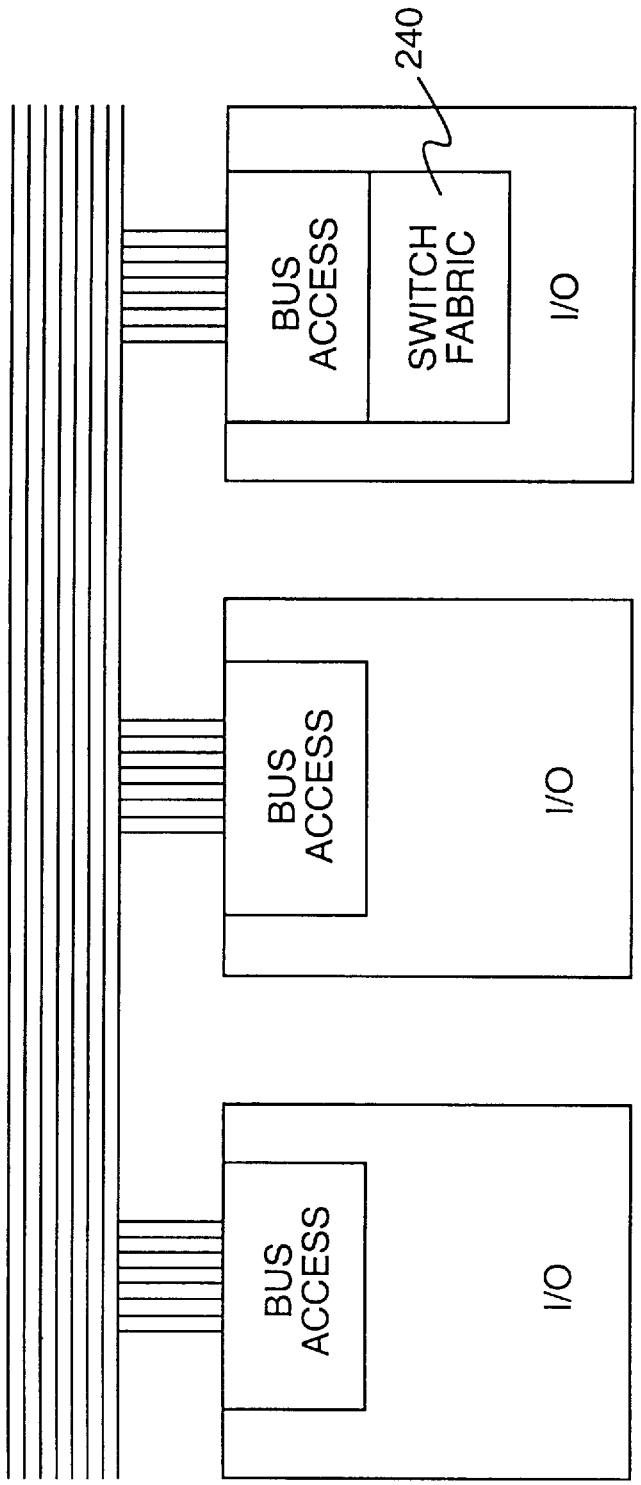
FIG. 2 is a block diagram of the system in FIG. 1 with a centralized fabric.
Figure 3:
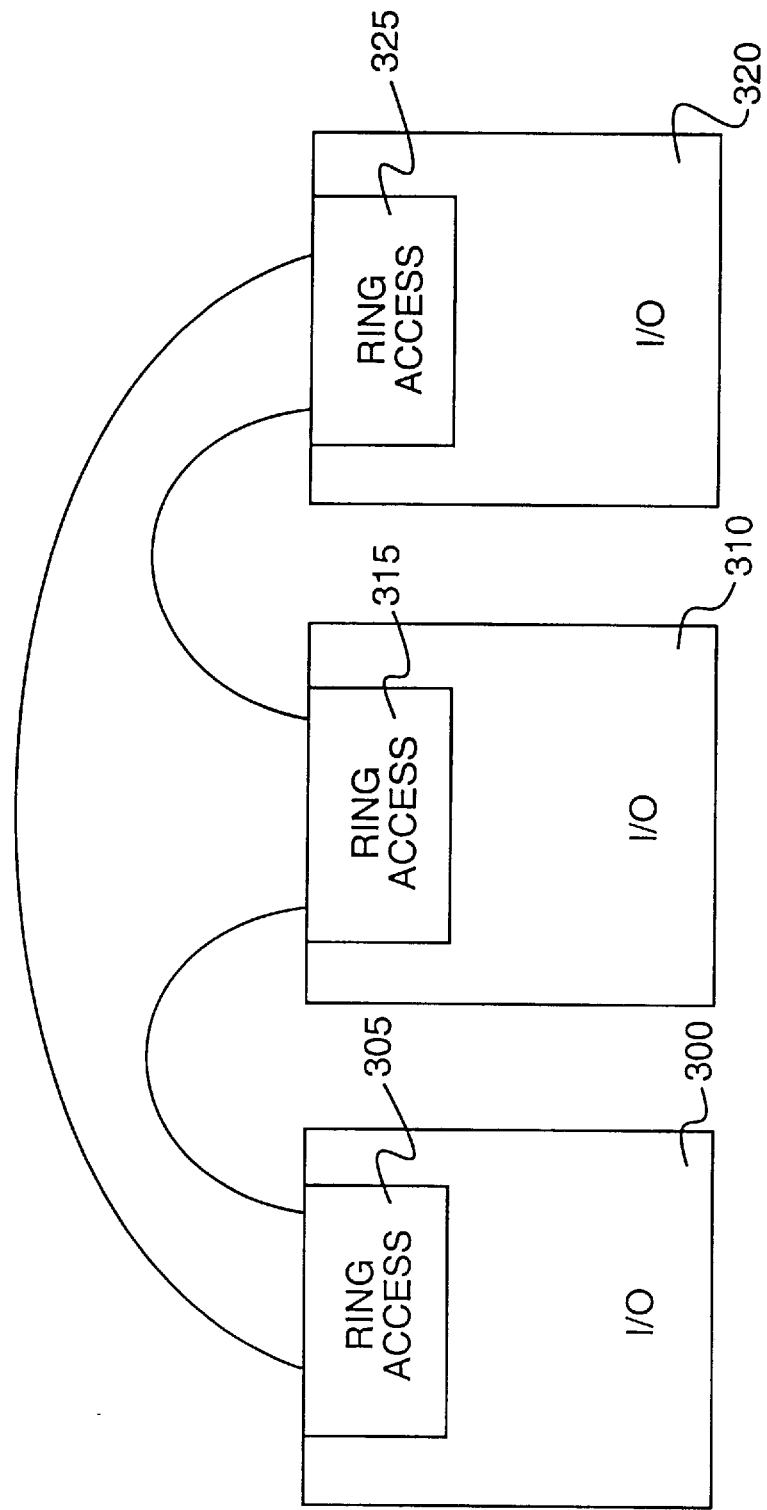
FIG. 3 is a block diagram of a ring-based architecture.
Figure 4:
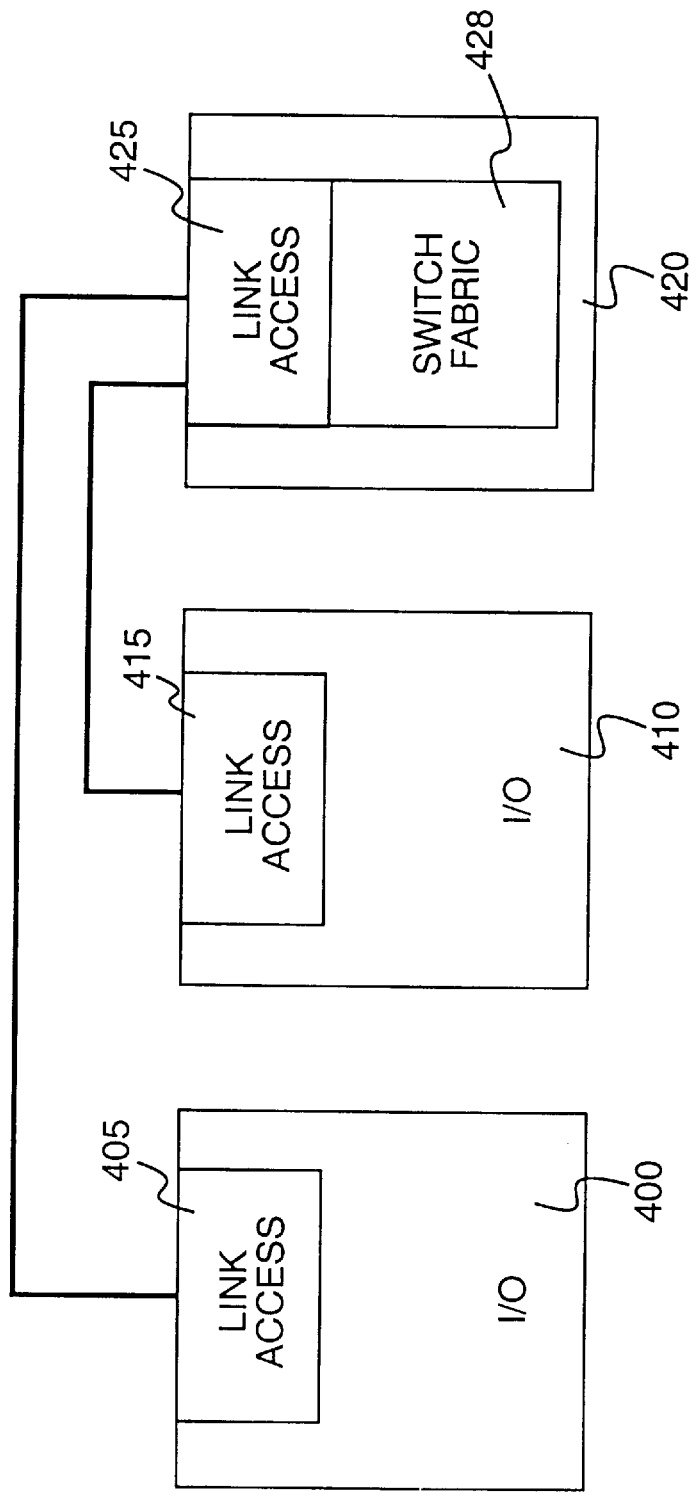
FIG. 4 is a block diagram of a product with a central switching fabric with one or more dedicated port connections to each slot.
Figure 5:
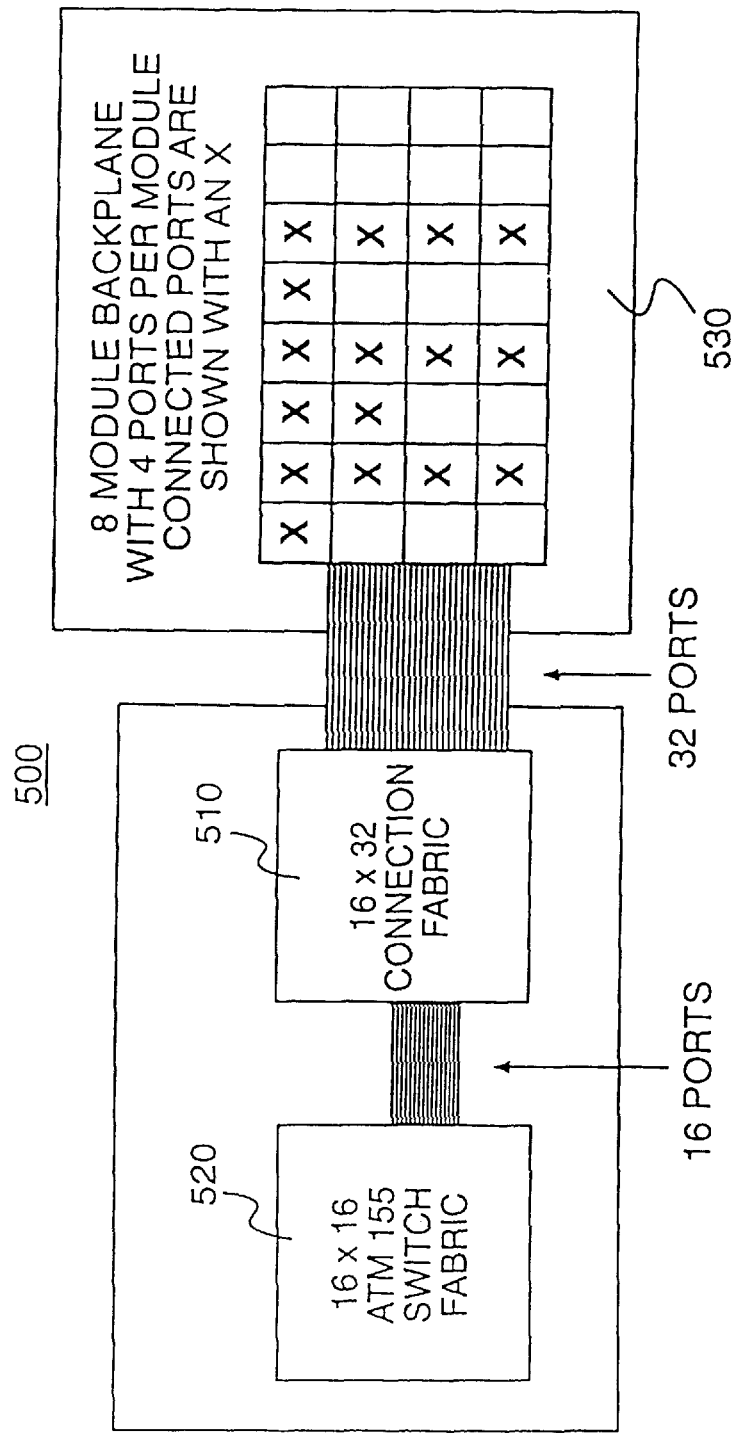
FIG. 5 is a block diagram of a preferred embodiment of this invention.

FIG. 5 is a block diagram of the architecture of a system 500 according to this invention. In system 500, a connection fabric 510 lies between active switching fabric 520 and the connections to each slot/module location, shown generally at backplane 530. Backplane 530 supports four ports per module and eight modules, for a total of thirty-two possible modules.

Sixteen switch ports, the capacity of switch fabric 510, connect connection fabric 510 and switching fabric 520. Thirty-two interconnect ports, the capacity of backplane 530, connect connection fabric 510 and backplane 530. The principal function of connection fabric 510 is to assign up to sixteen specific interconnect ports to a corresponding switching ports of switching fabric 520, as different applications required.

FIG. 5 also shows the typical situation where all available backplane slots are not in use. In addition, the modules in the slots that are in use do not have the same load. The "x" indicates an active port, showing backplane 530 with sixteen active ports. Some modules therefore have a single port operating while others have two or four. Configurable connection fabric 510 enables a user to scale both switching fabric 520 and I/O elements (not shown) connected to backplane 530 to meet the needs of particular applications. Because the slots or modules do not receive bandwidth based on their position, but rather through requirements of the connection fabric, the system easily accommodates elements providing a variety of functions. For example, high-bandwidth elements can use multiple ports, medium bandwidth elements may use one or two ports, and low bandwidth units would use a single port.

Figure 6:
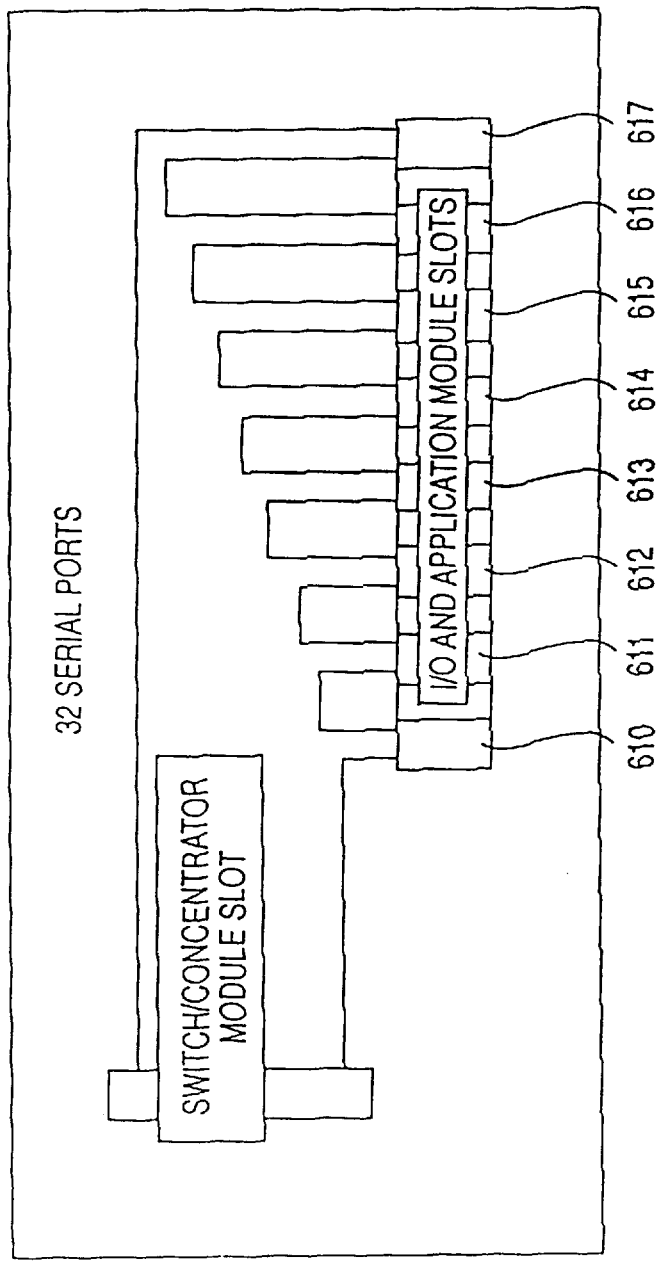
FIG. 6 is a diagram of a backplane for a connection fabric of this invention.
Figure 7:
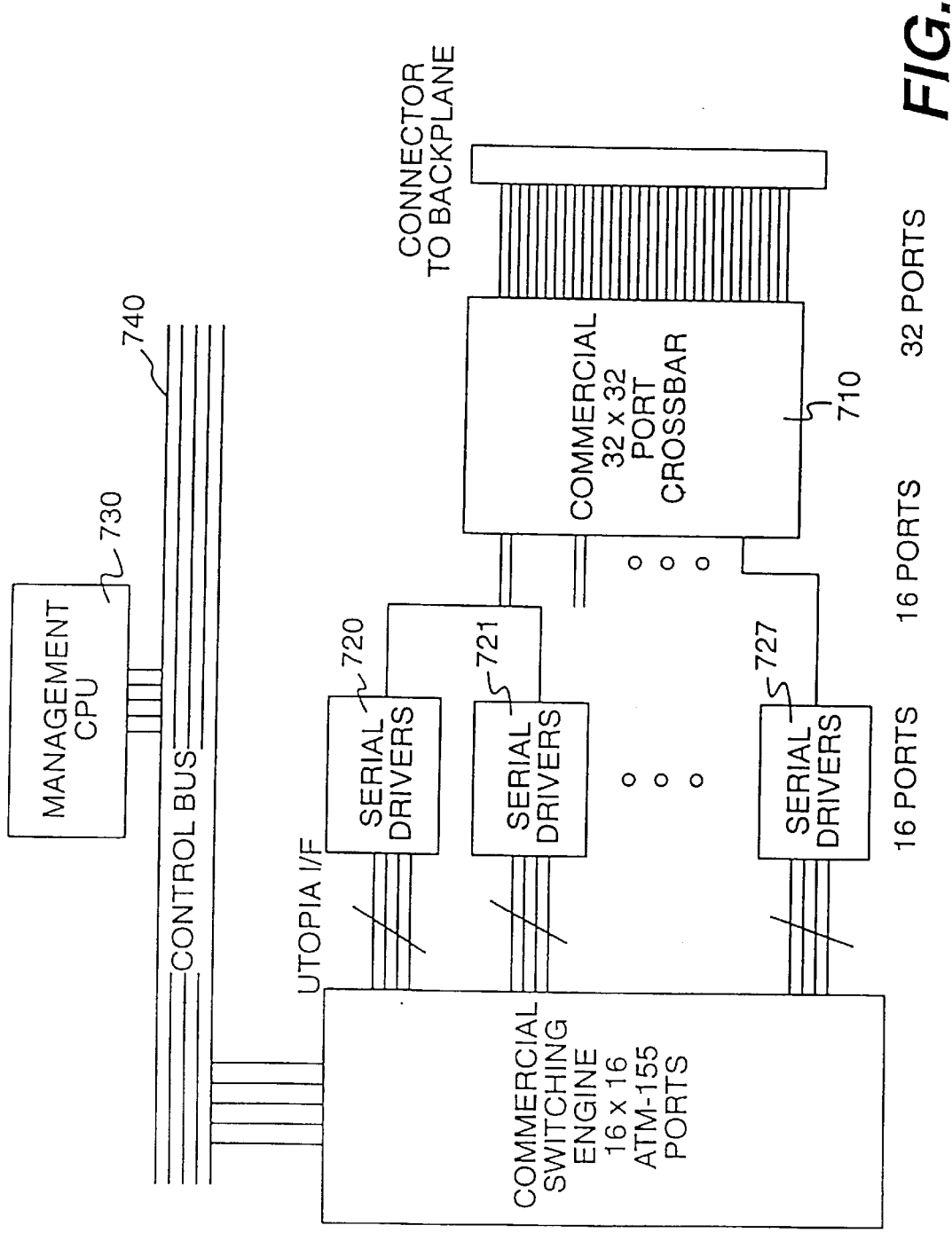
FIG. 7 is a more detailed diagram of the components of a switching system consistent with this invention.

FIGS. 6 and 7 show one possible implementation of connection fabric 510. FIG. 6, which is a diagram of the backplane for connection fabric 510, is based on a system with eight slots 610–617 for I/O devices and a slot 620 for a switching fabric. Each slot 610–617 has four interconnect paths operating at 155 Mbps for a capacity of thirty-two paths and with a backplane bandwidth of 4,960 Mbps. A redundant distribution path could also be provided to double the system capacity.

FIG. 7, which is a more detailed diagram of some of the elements of FIG. 5, shows connection fabric 510 as including a commercial 32×32 port crossbar chip 710. With 16-port switching fabric 520 and a 16—32 port connection crossbar (only half of the switching capability is needed) in connection fabric 510, any of the thirty-two ports in backplane 530 can be assigned to a port in switching fabric 520.

The path from the switching fabric 520 to backplane 530 is implemented in a serial form, so serial drivers 720–727 couple the outputs of switching fabric 520 to crossbar 710. The outputs from switching fabric 520 preferably use the UTOPIA standard interface.

A processor 730, coupled to switching fabric 520 and crossbar 710 by control bus 740, reconfigures connection fabric 710 each time a new I/O element is inserted into backplane 530 to deliver the necessary bandwidth for that new element. Specifically, the modules sense when they are inserted, for example by detecting power, and send a signal to the backplane identifying their bandwidth requirement. Control bus 740 receives those signals, along with an indication of the modules' locations in the backplane, and determines how to provide the needed bandwidth. Control processor then signals crossbar 710 using control bus 740 to connect the modules' ports to the ports of switching fabric 520.

Reconfiguration is usually not an ongoing occurrence, so the paths through connection fabric 510 do not change regularly. Therefore, the preferred embodiment does not require a sophisticated switch or memory to reconfigure, although one could be implemented for improved capabilities. In this implementation, the interconnect is a 155 Mbps ATM transmitted as serial signal paths. For Ethernet, the signaling could be 100Base-T.

This invention takes advantages of the different elements' strengths. For example, switching fabric 510 operates on individual cells or packets, and therefore provides rapid redirection of information streams between the interconnect ports. Connection fabric 520, on the other hand, provides a relatively static connection between an interconnect port and a switch port as the configuration and bandwidth needs of the device using that port requires.

This method has several advantages over the state of the art. For example, a chassis or modular base can be purchased based on the number of slots or card cage size, not switching capacity. Switches connected through the switching fabric can be sized to the number of active I/O modules, not to the size of the overall chassis. This enables users to optimize both bandwidth and cost.

In addition, the bandwidth to a single element can be varied from zero (i.e., power only) to the full number of wired interconnect lines, so the types of elements can be mixed. In conventional systems, each backplane slot has a fixed cost based on its percentage of the switch. If the device in that slot requires less bandwidth, then the overall bandwidth of the system is effectively wasted. The connection fabric of this invention allows new designs of mixed capability that are cost-effective due to the flexibility provided by this invention.

It will be apparent to those skilled in the art that various modifications and variations can be made in the connection fabric and switching product of this invention without departing from the scope or spirit of the invention. For example, the crossbar switch could be replaced by other switching devices and could be under different control.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A configurable connection subsystem to connect first ports coupled to a switching fabric and second ports connected to a digital system, the connection subsystem comprising:

configurable switch means for connecting the first ports to the second ports in response to configuration control signals; and control means, coupled to the configurable switch means, for creating and sending configuration control signals to the switch means to configure the switch means to connect each of a selected number of the second ports to corresponding ones of the first ports, the control means including means for receiving bandwidth requirements indicating a need for the selected number of ports, and configuration means for determining a configuration of the switch means based upon the selected number of ports.

2. The connection subsystem of claim 1, wherein the configurable switch means includes a programmable crossbar switch.

3. The connection subsystem of claim 1, wherein the control means includes a processor coupled to the crossbar switch by a control bus.

4. The connection subsystem of claim 1, wherein the bandwidth requirements indicate the number of ports required, and wherein the configuration means includes
   means for determining the total number of second ports required using the bandwidth requirements.

5. A switching system comprising a switching fabric including
   first data ports transmitting data, and
   dynamic interconnection circuitry for routing the data between the first data ports;

a digital system including
   a plurality of modules, and
   second data ports coupled to the modules; and a configurable connection fabric, coupled to the switching fabric and the digital system, including
   first switching ports coupled to the first data ports,
   second switching ports coupled to the second data ports,
   configurable switch means for connecting the first ports to the second ports in response to configuration control signals; and control means, coupled to the configurable switch means, for creating and sending configuration control signals to the switch means to configure the switch means to connect each of a selected number of the second ports to corresponding ones of the first ports, the control means including
   means for receiving bandwidth requirements indicating a need for the selected number of ports, and
   configuration means for determining a configuration of the switch means based upon the selected number of ports.

6. The switching system of claim 5, wherein the configurable switch means includes a programmable crossbar switch.

7. The switching system of claim 5, wherein the control means includes a processor coupled to the crossbar switch by a control bus.

8. The switching system of claim 5, wherein the switching fabric includes
   means, coupled to the control means, for controlling the dynamic interconnection circuitry.

9. The switching system of claim 5, wherein the modules include
   means for generating the bandwidth requirements.

10. The switching system of claim 5, wherein the digital system includes a backplane connected between the modules and the second data ports.

11. The switching system of claim 5, wherein the bandwidth requirements indicate the number of second switching ports required for at least one of the modules, and
   wherein the configuration means includes
   means for determining the total number of second ports required using the bandwidth requirements.

12. A method of connecting first ports coupled to a switching fabric and second ports coupled to a digital system comprising the steps of:
   receiving bandwidth requirements indicating a need for a selected number of ports;
   determining a switching configuration based upon the bandwidth requirements;
   generating configuration control signals to implement the switching configuration; and
   sending the configuration control signals to a configurable switch.

13. The method of claim 12, further including the step of configuring the configurable switch fabric in response to the configuration control signals.

* * * * *